United States Patent [19]
Chase et al.

[11] Patent Number: 5,944,780
[45] Date of Patent: Aug. 31, 1999

[54] NETWORK WITH SHARED CACHING

[75] Inventors: Jeffrey Scott Chase; Syam Gadde, both of Durham, N.C.; Michael Rabinovich, Gillette, N.J.

[73] Assignee: AT&T Corp, New York, N.Y.

[21] Appl. No.: 08/850,411

[22] Filed: May 5, 1997

[51] Int. Cl.⁶ ................................................... G06F 15/16
[52] U.S. Cl. .......................... 709/201; 709/212; 709/213
[58] Field of Search ........................ 395/200.43, 200.46, 395/200.47, 200.56, 200.57, 200.31, 200.33, 200.42; 711/147, 148; 707/10

[56] References Cited

U.S. PATENT DOCUMENTS

| | | | |
|---|---|---|---|
| 5,222,242 | 6/1993 | Choi et al. | 395/200.57 |
| 5,276,848 | 1/1994 | Gallagher et al. | 711/121 |
| 5,511,208 | 4/1996 | Boyles et al. | 395/800 |
| 5,715,395 | 2/1998 | Brabson et al. | 395/200.56 |

OTHER PUBLICATIONS

Radhika Malpani et al, "Making World Wide Web Caching Servers Cooperate," http://www.w3.org/Conferences/WWW4/Papers/59/ Fourth International WWW Conference held in Boston, Mass., Dec. 1995.

"Reduce, Reuse, Recycle: An Approach to Building large Internet Caches" by Syam Gadde, Michael Rabinovich and Jeff Chase, Jan. 15, 1997. The Sixth Workshop on Hot Toics In Operating Systems, IEEE Conference Proceedings, Cape Cod, MA, USA, 1997, 970505–970506.

"GeoPlex Convergence Software for Integrated Global and Enterprise Networks", Geosphere Communications, Inc., Technology Backgrounder, Sep., 1996.

*Primary Examiner*—Mehmet B. Geckil

[57] ABSTRACT

In a computer network system, the caches at individual stations are available to other stations. A central cache directory is maintained at a network server. Each time a station caches a data object received from a remote network, it informs the central cache directory. When a station comes online, it is asked to send a list of the contents of its cache. Whenever a station seeks an object from the remote network, the local network server first checks the central directory cache to see if the request can be satisfied at one of the local stations. Only if it cannot is the requested object retrieved from the remote network.

15 Claims, 3 Drawing Sheets

NETWORK WITH SHARED CACHING

BACKGROUND OF THE INVENTION

This invention relates to computer networks in which a plurality of local stations that are networked together also communicate with an external database. More particularly, this invention relates to such a network in which each station can share data from the external database that has been cached by other stations.

In data networks such as the Internet, data is stored on servers interconnected by high-speed connections. Such networks support protocols, such as the Hypertext Transfer Protocol ("HTTP") used in the popular World Wide Web portion of the Internet, in which data is transmitted to users in a format known as a "page." Under the HTTP protocol, the user interface software (known as a "browser") cannot begin to display a page until a significant portion of the page has been received, and clearly cannot fully display the page until the entire page has been received. The resulting delays are referred to as "latency."

Unfortunately, many Internet users are connected to the Internet by relatively slow connections. Even where users a connected to a fast local-area network—e.g., a corporate "intranet"—the local-area network may be connected to the Internet using modems and standard telephone lines. Even the fastest commercially available telephone modems are limited to speeds of between 28.8 kilobits per second ("kbps") and 57.6 kbps. This limits the speed at which a World Wide Web page can be transmitted to a user and displayed by the user's browser. In addition, heavy user traffic, particularly heavy access by other users to the same server, also slow down the apparent speed of the World Wide Web. As a result, many users complain about the slow speed of the Internet in general, and the World Wide Web in particular. In fact, much of the latency perceived by users is the result of their relatively slow connection to, and heavy traffic on, what inherently ought to be a very fast network.

Currently available browser software makes some attempts to eliminate delays in receiving World Wide Web pages. For example, most browsers will store received pages in a disk cache. If the user asks for a page within a short time after having asked for it previously, the browser will retrieve the page from the cache. However, under the HTTP protocol, certain World Wide Web pages may not be cached, such as those that are dynamically generated. Therefore, current caching techniques are of limited usefulness in solving the latency problem.

More sophisticated, and therefore more useful, caching techniques can be employed in environments in which multiple users are connected to a local network that is connected to the Internet or other remote network—e.g., in a corporate in-house network or "intranet" that has a gateway to the Internet. In such environments it is known to have a central cache, either at the gateway or at a separate cache server. The central cache caches all pages or other data received from the remote network in response to a query by any user on the local network. If another user (or the same user again if for some reason the data are not cached at the user's station) requests the same data, the data can be delivered to that user from the central cache of the local network, without having to be retrieved from the remote network. Such an arrangement enhances the benefits of caching by making every user's cached data available to all other users on the local network, instead of being available only to the user who previously requested it.

However, arrangements such as that described have disadvantages. In order for the central cache to be useful, each user request for data from the remote network must be routed through the central cache to see if it can be satisfied there. The central cache can thus become a bottleneck, slowing down each user's queries as they wait behind other users' queries while the central cache searches to see if it has the requested data for each query. In fact, an overloaded central cache may even drop user requests without servicing them.

As a further refinement of a system having a central cache, systems are known in which different groups of users are served by their own central caches, but the central caches cooperate. Thus, not only is the central cache queried when a user makes a request, but also, if the central cache associated with that user does not have the requested data, then before the data are requested from their home site on the remote network, the other central caches serving other groups in the system are queried first. Although in such a system, the likelihood is greater that some cache will contain the requested data, avoiding the need to retrieve them from their home site, at some point it ceases to be efficient if too many cache servers have to be queried. Moreover, each time a cache server receives a query from another cache server, it adds to the delay in processing requests at the first cache server from its own associated users.

In another known system, objects in a network file system are cached at individual user stations of the network. However, such a system, designed for data that reside within the local-area network and that may be modified by users, entails complex mechanisms to maintain coherency of cached data and data availability in the case of failure of a station. These mechanisms provide only limited performance improvement (and may even degrade performance), and impose significant overhead that is unnecessary in an Internet access environment.

It would be desirable to be able to provide a system having the benefits of central caching without the bottleneck caused by a central cache server.

SUMMARY OF THE INVENTION

It is an object of the present invention to provide a system having the benefits of central caching without the bottleneck caused by a central cache server.

In accordance with this invention, there is provided a computer system having a plurality of local stations, a communications channel interconnecting the plurality of local stations, and a communications link connecting the communications channel to an external database. Each respective one of at least a first subset of the local stations has its own respective cache memory for caching data retrieved by that respective local station from the external database. The computer system further has a central directory unit for maintaining a directory of data cached in the cache memories of respective ones of the first subset of local stations. When a respective one of a second subset of local stations requires data from the external database, a cache query unit in that respective one of the second subset of the local stations queries the directory to determine whether the required data are cached in a respective cache memory of the first subset of local stations. A cache access unit in each respective one of the first subset of the local stations allows access to the respective cache memories by respective ones of the second subset of local stations.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
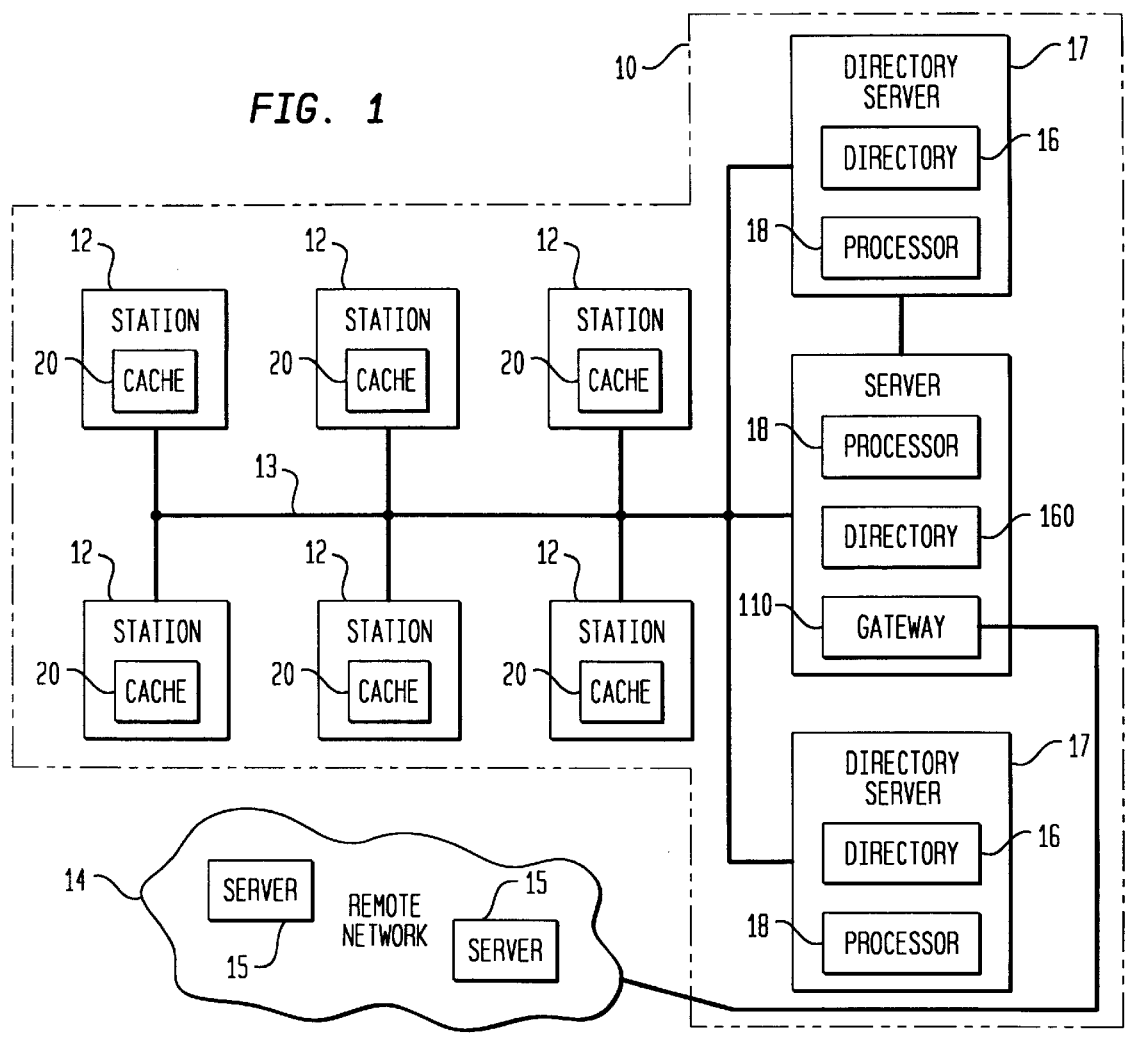
FIG. 1 is a schematic diagram of a preferred embodiment of a computer system according to the present invention.

Although applicable generally to network data transfers, the present invention is particularly useful, and lends itself to ready explanation, in connection with the Internet, and particularly the World Wide Web. When a user requests data from a server on the World Wide Web, those data are transmitted to the user in units called "pages." The software that communicates with the World Wide Web, referred to as a "browser," stores received pages in a cache, generally on the disk drive of the user's station. If the user later requests the same page, the browser, which always looks in its cache before submitting a request to the World Wide Web, will find the page in the cache and display it without the delay involved in retrieving it from its home server.

In a situation in which a user is connected to the Internet or other remote network through a local network—e.g., a corporate local area (or wide area) network, the present invention gives each user the benefit of the user station caches of all of the other user stations on the local network. Therefore, a user will be able to quickly retrieve not only pages that that user had recently requested, but also pages that other users of the local network have recently requested. Indeed, because one might expect users in a single enterprise to frequently request pages from remote servers that provide data useful in the enterprise's field of endeavor, it would be expected that different users would frequently request data from the same remote servers. Therefore, in such an environment, as opposed to in a generic group of Internet users, there is a greater likelihood that if the requested page is not cached at the requesting user's station, then it is cached at another user's station. Therefore, even though the user has not recently requested that page, he or she obtains nearly the same speed advantage as though the page had been cached at his or her station.

In general, this type of shared caching is most beneficial in the context of a local network to which users are directly connected, so that each station can get access to the cache of any other station, and the connection speed is relatively high so that access by one station of a second station's cache does not appreciably slow down the second station's connection to the network. However, it is also possible to implement such a system on a dial-up network, albeit with some sacrifice of speed to an individual user as other users' requests absorb some capacity of the individual user's connection. Thus, an Internet Service Provider might implement such a system among its subscribers. However, careful consideration would have to be given to the trade-offs between the gain from shared caching and the losses associated with the limited capacity of dial-up connections, and with the intermittent nature of the connections (i.e., the fact that users come and go, rather than being substantially permanently connected, making it difficult to keep track of which user caches are available at any given time).

In order to implement a system according to the invention, a central cache directory would have to be maintained on the local network, either at the network's gateway to the remote network, or, preferably, in a separate directory server. Each remote network request would be checked against the central cache directory to determine whether or not any local cache contains the requested data. If so, the request would be routed to the local station that has cached the data; otherwise, the request would be sent to the remote network.

Because the central cache directory processor (whether a separate server or part of the gateway) is merely checking the request against its directory and routing the request to the correct local cache, if any, and is not actually servicing any requests as a central cache would, it does not cause the same kind of bottleneck as a central cache. In fact, it is believed that up to 100,000 user stations can be serviced by a single directory server with substantially no noticeable performance degradation. In the unlikely event that the load on the directory server becomes too large, one or more additional directory servers could be added, with each one serving a defined portion of the data address namespace (e.g., in the case where the remote network is the World Wide Web, each directory server could service a different alphabetical portion of the Uniform Resource Locator ("URL") namespace).

In addition to providing the central directory, it would be necessary to provide a process that runs on each local station that would allow other stations to access its cache. The process could be provided as part of the local station's browser software.

Some method preferably would also be provided for keeping the directory current. Thus, each time data are retrieved from the remote network, either the gateway server or the local station that requested the data preferably would advise the directory server that those data are now available in that local station's cache. Most preferably, the local station would perform that function. If the local station is to perform the function, a process for the function would have to be provided at the local station.

Similarly, the system would have to be able to recover from the unavailability of a station, either because of a malfunction or because the user shuts the station down. The unavailability of a particular station ordinarily would be detected when a second station attempted to retrieve a cached object from the unavailable station. The attempt would fail, and the second station would notify the directory server of the failure and that it was unable to communicate with the unavailable station. The directory server would then delete from the cache directory, or mark as unavailable, all objects cached at the unavailable station.

Optionally, the directory server might be made aware of the unavailability of a station as part of the logoff sequence if and when the user intentionally logs off the network. The unavailability of the station would be handled in the same way as if the station unavailability was discovered through a retrieval failure. This option of informing the directory server of a station logout is particularly useful if shared caching according to the invention is implemented in a dial-up environment where stations frequently become unavailable as they break their dial-up connections.

When a station establishes communication with the network, either for the first time or after a failure or shutdown, the station preferably would notify the directory server that it is available, and would transmit a list of all of the objects in its cache. The central cache directory could then be updated from that list. Alternatively, at least in the case of a station that had been present previously, the directory server could assume that whatever was in the local station's cache previously is still there. However, there is a risk that one or more previously cached objects may no longer be present—e.g., because they may have been damaged or deleted by whatever caused the station to fail. In that case, when the object is unavailable to satisfy a request directed to the station by the directory, even though the station itself is available, that one object could be deleted from the directory. The object preferably would not be restored to the directory until it was again cached at the local station, or at another local station.

Instead of having a station communicate the entire contents of its cache as soon as the station connects to the network, the system could be configured so that when a station that has never before (or at least has not in a long time) made a query makes a query, the directory server asks for the contents of that station's cache. However, in such an implementation, data cached at the station would not be available to other stations as soon as it would be in an implementation where the station communicates the contents of its cache when it first connects to the network.

In no case would failure of an attempt by one local station to retrieve cached data from another be fatal in a system according to the invention, because on occurrence of a cache retrieval failure, the system would simply request the data from its home site on the remote network.

The invention will now be described with reference to FIGS. 1–4.

An environment in which the present invention may be used is shown in FIG. 1. Local area network 10 preferably includes a server 11 connected by communications channel 13 to a plurality of user stations 12. Communications channel 13 could be any suitable network topology (e.g., star, bus ("ethernet") or token-ring). Local area network 10 is preferably connected through a suitable gateway 110, which is this case is part of server 11, but could be separate, to remote network 14 such as the Internet, which includes a plurality of remote servers 15, each of which may have data sought by a user of one of stations 12 of local area network 10. In an alternative preferred embodiment (not shown), user stations 12 could communicate with server 11 in a dial-up configuration over, e.g., the public switched telephone network.

Figure 2:
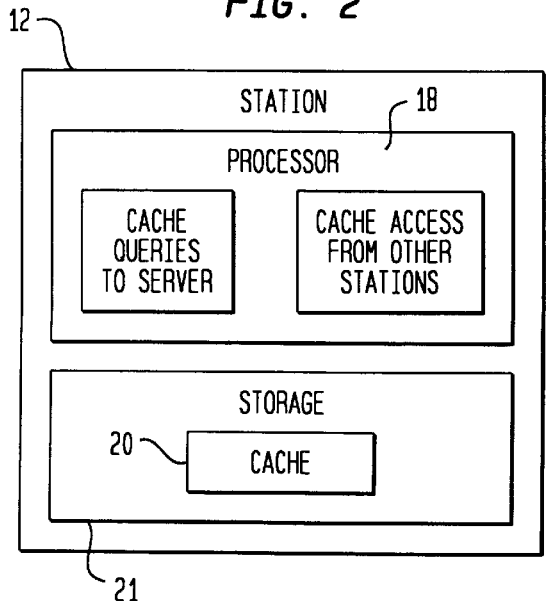
FIG. 2 is a schematic diagram of a preferred embodiment of an individual user station of the computer system of FIG. 1.

As shown in FIG. 1, and in more detail in FIG. 2, each user station 12 includes a cache 20, which is kept in the mass storage 21 provided in station 12. Ordinarily, mass storage 21 takes the form of one or more hard disk drives, and hence cache 20 is kept on one or more of those hard disk drives. However, mass storage 21 (and cache 20) could be some other form of memory.

As described above, whenever any one of stations 12 retrieves a page (or other unit) of data from one of remote servers 15 on the Internet or other remote network 14, the browser or other client software controlling the retrieval deposits a copy of that unit of data in cache 20 of that station 12. If the user of that station 12 again requests data from remote network 14, the client software first looks to cache 20 of that station 12 to see if the data are already in cache 20. If not, then, in accordance with the present invention, before attempting to retrieve the data from remote network 14, the client software first queries a central cache directory 16, preferably located in one or more directory servers 17. If multiple directory locations are used (e.g., as shown in FIG. 1, the directory is divided between two separate directory servers 17), then the address namespace preferably is partitioned among them as described above to facilitate searching for particular data when a request is received from one of stations 12. In an alternative embodiment, a central cache directory 160 could be co-located with server 11 itself.

If directory 16 does not contain an entry corresponding to the requested data, the requesting station 12 is so informed and then requests the data from remote network 14 via server 11 and gateway 110. In the alternative embodiment where directory server 160 is co-located with server 11, server 11 could go directly to remote network 14 to retrieve the data, rather than informing server 12 which would then have to ask server 11 to go to remote network 14 (not shown). Preferably, when the data are received from remote network 14 in either case, in addition to preferably being displayed to the user they preferably are added to cache 20 at the requesting station 12, and station 12 preferably informs server 11 and/or directory server 17 that those data are now in its cache, so that if another station 12 requires those same data, it will be able to find them in directory 16 or 160.

However, if directory 16 or 160 contains an entry corresponding to the requested data, the requesting station 12 requests the data from that other one of stations 12 indicated by the directory entry. If the requesting station 12 is unable to retrieve the requested data from the other station 12 (e.g., because the other station 12 is down or because the data, for whatever reason, have been deleted from cache 20 of the other station 12), it so informs server 11 and/or directory server 17, as may be appropriate. Server 11 or 17 then marks the entry corresponding to that data as unavailable (or deletes it altogether).

Once data have been marked in the central cache directory 16 or 160 as being unavailable (or the entry corresponding to those data have been purged from directory 16 or 160), they are not restored until a message is received from the station 12 in whose cache 20 the data resides. If the data were unavailable because the station 12 was down, then station 12 preferably runs a process when it is reactivated that sends a list of all objects in its cache 20 to directory 16 or 160. If the data were unavailable because they had been purged from cache 20 of that station 12, the entry for those data will not be restored to directory 16 or 160 unless and until that station 12 again requests those data, receives them, and caches them in its cache 20 (although it should be pointed out that by that time there will be another entry in directory 16 or 160 indicating that those data are in cache 20 at a different station 12—viz., the one which first reported to directory 16 or 160 that the data were unavailable at the first station 12, because that different station 12 would have then had to retrieve the data from remote network 14 and preferably added them to its own cache 20, advising directory 16 or 160 in the process).

Stations 12 and servers 11, 17 preferably are conventional personal computers, workstations or network servers, each preferably having a processor 18 which preferably runs software processes to implement the present invention.

Figure 3:
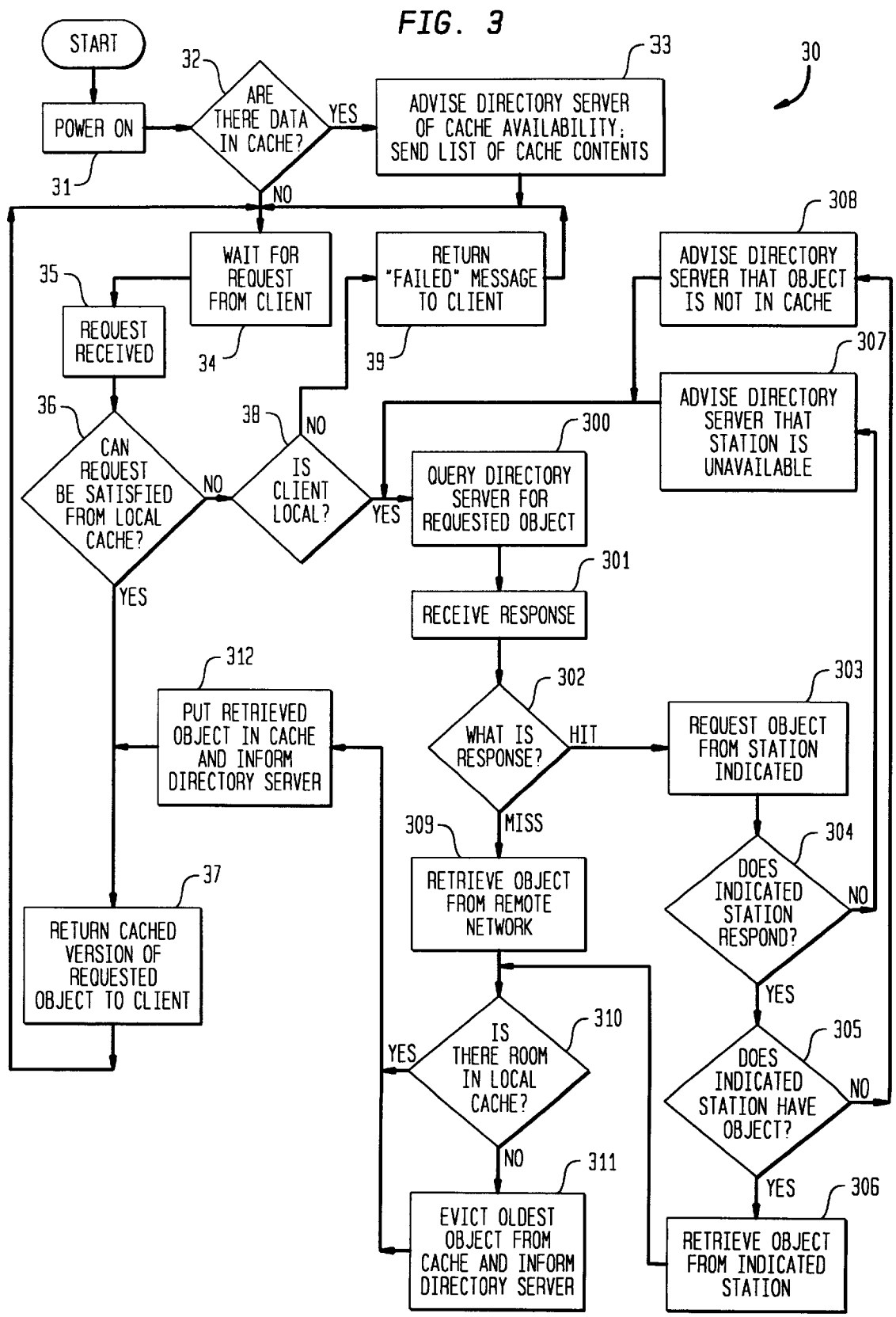
FIG. 3 is a flow diagram showing a preferred embodiment of the method of operation of the computer system of FIGS. 1 and 2.

FIG. 3 is a flow diagram of software process 30 which preferably runs on processor 18 of each station 12. Process 30 starts at step 31 when the power is turned on at station 12 (after other startup processes). At test 32, it is determined whether or not there are any data in cache 20. If so, then at step 33 the directory server is advised of the availability of cache 20, and of its contents, and the system continues to step 34 to wait for a request from the client software (e.g., browser) of either this station 12 or any other station 12 on network 10. If at test 32 there are no data in cache 20, the process proceeds directly to step 34 to await a request. Note that test 32 and step 33 are optional as described below.

Next, at step 35, when a request is received, the process proceeds to test 36 to determine whether or not the request can be satisfied by the local cache 20. If so, the cached data object is returned to the client software for display at step 37. Otherwise, the process proceeds to test 38 to determine whether the requesting client is local or remote (at another station 12). If at test 38 it is determined that the client is remote, then at step 39 the process sends a message to the remote client that the attempt to retrieve the requested data failed, and the process resumes waiting at step 34 for a new request.

If at test 38 the client is determined to be local, then the process proceeds to step 300 where the directory server 17 (or the directory in server 11) is queried to determine if it has any entry corresponding to the requested data, and at step 301 the process receives a response. At test 302, the process determines whether the response is a "hit" or a "miss." If at test 302 the response is a hit, then at step 303 the process requests the desired data object from the station indicated in the response as having a cached copy of the object. At test 304, the process determines whether or not the indicated station is responding to the request. If so, then at test 305 the process determines whether or not the indicated station has the requested object. If so, then at step 306 the object is retrieved from the indicated station.

If at test 305 the indicated station does not have the object, then at step 307 the process advises the directory server that the object is not in the indicated cache so that the directory can be updated (e.g., by deleting that entry or labelling it "unavailable"), and the process returns to step 300 to again determine if the requested object is cached at any station 12 (the directory may return a different entry indicating that the object is also cached at yet a different station 12, so the process need not proceed directly from step 305 to step 309 (see below)). Similarly, if at test 304 the indicated station does not respond at all, then at step 308 the process informs the directory server that the indicated station is not available, so that the directory server can properly mark or purge any directory entries associated with the unavailable station, and the process then returns to step 300.

If at test 302 it is determined that the response was a miss, then at step 309 the object is retrieved from the remote network. Whether the object is retrieved from the remote network at step 309, or from the indicated cache at step 306, the process then proceeds to test 310 to determine whether or not there is room in the local cache. If not, then at step 311, an object is evicted from the local cache to make room and the directory server is advised so that it can purge the corresponding entry (eviction may be based on age or other criteria). The system then proceeds to step 312 (to which it also proceeds from test 310 if there is room in the local cache), where it puts a copy of the retrieved object in the local cache and advises the directory server so that it can add a corresponding entry. Next, the process proceeds to step 37, returning the requested object to the client for display. Whether it reaches step 37 from test 36 or step 312, the system returns from step 37 to step 34 to await additional requests.

Figure 4:
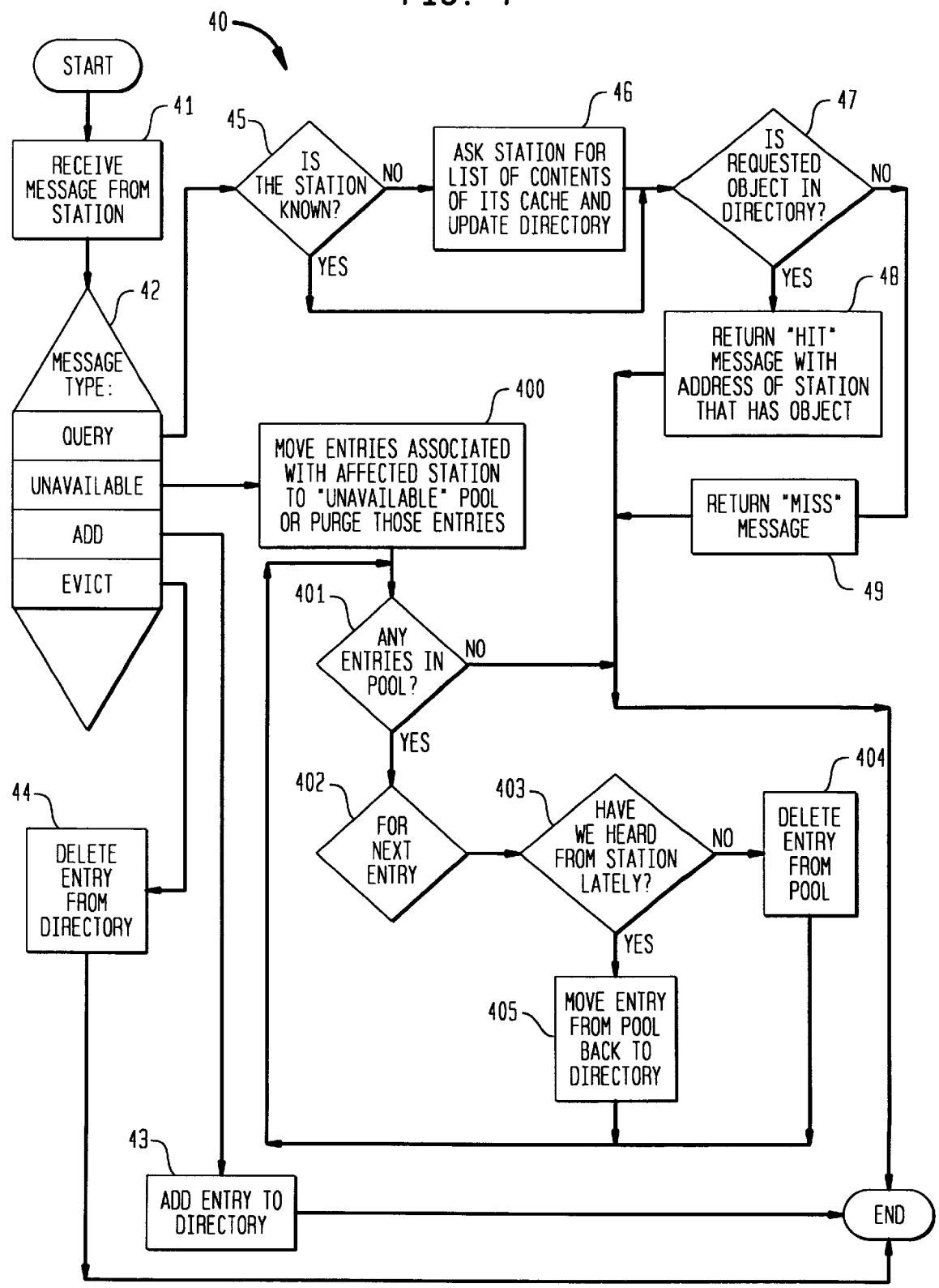
FIG. 4 is a flow diagram of a portion of the method of FIG. 3.

FIG. 4 is a flow diagram of software process 40 which runs on processor 18 of server 11, and processor 18 of any directory server 17. Process 40 begins at step 41 where it receives a message from one of stations 12. As seen at 42, that message preferably can be one of four types: "QUERY", "UNAVAILABLE", "ADD" or "EVICT". If at 42 the message is "ADD", it means that the station 12 sending the message has retrieved data for the first time (either from the remote network 14 or from another station 12), and has added it to its local cache. Therefore, the process proceeds to step 43 where an entry is added to the central cache directory 16 or 160 indicating that those data (as represented by an address such as a World Wide Web URL) are stored in the cache of that particular station 12, and the process ends.

If at 42 the message is "EVICT", it means that the station 12 sending the message has had to delete some data from its cache (usually to make room for other data). Therefore, the process proceeds to step 44 where the entry in central cache directory 16 or 160, indicating that those data were stored in the cache of that particular station 12, is deleted, and the process ends.

If at 42 the message is a query, the process proceeds to test 45, where it determines whether or not it has ever heard from the querying station. If not, then at step 46 it asks the querying station for a list of the contents of the local cache of the querying station, and updates central cache directory 16 or 160 accordingly. If at test 45 it is determined that the querying station has been heard from before, the process skips directly to test 47. Note that test 45 and step 46 are optional, and preferably would not be used if test 32 and step 33 of process 30 are used—i.e., ordinarily one would use either test 32 and step 33 or test 45 and step 46, but not both pairs of tests/steps (although it could be done).

At test 47 the process determines whether or not the requested object is in the central cache directory. If it is, then at step 48 directory server 11 or 17 preferably returns a "HIT" message to the querying station 12, along with the address of that station 12 that has the requested object, and the process ends. The querying station 12 can then go and retrieve the object from the station 12 that has it.

If at test 47 the process determines that the requested object is not in the central cache directory, it returns a "MISS" message to the querying station, and the process ends. The querying station can then go and retrieve the object from its home server 15 on remote network 14. Alternatively, as discussed above (but not shown in FIGS. 3 and 4), in an embodiment where the central cache directory is co-located with the server, the server could simply retrieve the object from the remote network without waiting for the querying station to request such retrieval, eliminating the need for a "MISS" message and a subsequent request for remote retrieval.

If at test 42 the message is that an object is unavailable—i.e., a station 12, having received a "HIT" message in response to an earlier query, attempted to retrieve an object from another station 12 and was unable to do so—then system 10 responds at step 400. The response may depend on the reason for the unavailability, which preferably is included in the "UNAVAILABLE" message. If the station 12 that is supposed to have the object is responding, but does not have the object, that means that somehow the central cache directory is out of synchronization with the various stations 12, and the response at step 400 preferably is to purge the affected directory entry, so that there is no longer an entry indicating that that particular station 12 has the particular object.

If, however, the reason for the unavailability is that the station 12 that is supposed to have the object is not responding at all, then one might assume that its cache is intact, but it is not online at the moment. Therefore, the response at step 400 preferably is to move every directory entry associated with the affected station 12 to an "unavailable" pool, where they wait until the particular station 12 is back online, when they can be moved back to the directory. This portion of process 40 is shown at steps/tests 401–405.

At test 401, the process determines whether or not there are any entries in the "unavailable" pool. If not, the process ends. If at test 401 there are entries in the unavailable pool, then at 402 a loop begins for each entry. At test 403, the process checks to see how long it has been since the station associated with the entry has been heard from. If the station has not been heard from lately—e.g., it was last heard from more than about two hours ago—it is assumed that the station is experiencing difficulty (or has been turned off) and will not be back online soon, so the entry is deleted from the pool at step 404 (and will not be returned to the directory until step 33 or step 46 is run for that entry) and the process loops back to check additional entries in the "unavailable" pool. If at test 403 the station has been heard from lately—i.e., it is back online—then the entry is moved from the "unavailable" pool back to the central cache directory, and the process loops back to check additional entries in the "unavailable" pool.

The interval used in test 403 (an example of two hours was given above, but any interval may be used) is selected based on a balance between (a) not purging entries when a station is unavailable merely because of a temporary communications problem, and (b) not maintaining entries when a station has been taken offline. Although when a station has been taken offline the entries could be maintained in the "unavailable" pool for as long as it takes the station to return online, it is possible that if there is a prolonged offline condition, the local cache 20 of that station could be corrupted or become obsolete, so that even when the station was back online, the cached objects may not be available. Therefore, they preferably are purged once the interval in test 403 is exceeded.

Thus it is seen that a system having the benefits of central caching without the bottleneck caused by a central cache server has been provided. One skilled in the art will appreciate that the present invention can be practice by other than the described embodiments, which are presented for purposes of illustration and not of limitation, and the present invention is limited only by the claims which follow.

What is claimed is:

1. A computer system comprising:
    a plurality of local stations;
    a communications channel interconnecting said plurality of local stations; and
    a communications link connecting said communication channel to an external database; wherein:
        each respective one of at least a first subset of said local stations comprises respective cache memory for caching data retrieved by said respective local station from said external database; said computer system further comprising:
            a central directory unit for maintaining a directory of data cached in said cache memories of respective ones of said first subset of local stations;
            a cache query unit in each respective one of at least a second subset of said local stations for, when said respective one of said second subset of local stations requires data from said external database, querying said directory to determine whether said required data are cached in a respective cache memory of said first subset of local stations; and
            a cache access unit in each respective one of said first subset of said local stations for allowing access to said respective cache memories by respective ones of said second subset of local stations.

2. The computer system of claim 1 further comprising a cache directory manager for maintaining said directory in said central directory unit.

3. The computer system of claim 2 wherein said cache directory manager comprises a local station status monitor for:
    determining when one of said local stations is unavailable; and
    when said one of said local stations is determined to be unavailable, marking as unavailable in said directory any data identified in said directory as being cached at said one of said local stations.

4. The computer system of claim 3 wherein said cache directory manager further comprises, in each of said local stations in said first subset of local stations, a cache status identification unit for identifying to said cache directory manager data available in said cache memory of said local station.

5. The computer system of claim 4 wherein said cache status identification unit identifies data to said cache directory manager when said local station becomes available.

6. The computer system of claim 4 wherein said cache status identification unit identifies data to said cache directory manager when data are added to said cache memory of said local station.

7. The computer system of claim 1 wherein, when said cache query unit determines that said required data are not cached in any cache memory of any of said first subset of said local stations, said respective one of said second subset of said local stations seeks said required data from said external database.

8. The computer system of claim 1 wherein said first subset of said local stations comprises all of said local stations.

9. The computer system of claim 1 wherein said second subset of said local stations comprises all of said local stations.

10. A method of operating a computer system, said computer system comprising:
    a plurality of local stations,
    a communications channel interconnecting said plurality of local stations, and
    a communications link connecting said plurality of local channels to an external database, said method comprising the steps of:
        maintaining at each respective one of at least a first subset of said local stations a respective cache memory for caching data retrieved by said respective local station from said external database;
        maintaining a central directory of data cached in said cache memories of respective ones of said first subset of local stations;
        when said a respective one of at least a second subset of local stations requires data from said external database, querying said directory to determine whether said required data is cached in a respective cache memory of said first subset of local stations; and
        at each respective one of said first subset of said local stations, allowing access to said respective cache memories by respective ones of said second subset of local stations.

11. The method of claim 10 further comprising monitoring said first subset of said local stations for:
- determining when one of said local stations is unavailable; and
- when said one of said local stations is determined to be unavailable, marking as unavailable in said directory any data identified in said directory as being cached at said one of said local stations.

12. The method of claim 11 further comprising each of said local stations in said first subset of local stations identifying to said central directory data available in said cache memory of said local station.

13. The method of claim 12 wherein said identifying step comprises identifying data to said central directory when said local station becomes available.

14. The method of claim 12 wherein said identifying step comprises identifying data to said central directory when data are added to said cache memory of said local station.

15. The method of claim 10 wherein, when it is determined in said querying step that said required data are not cached in any cache memory of any of said first subset of said local stations, seeking said required data from said external database.

* * * * *